United States Patent

[11] 3,568,018

| | | |
|---|---|---|
| [72] | Inventor | Norman L. Macdonald<br>Chicago, Ill. |
| [21] | Appl. No. | 831,121 |
| [22] | Filed | June 6, 1969 |
| [45] | Patented | Mar. 2, 1971 |
| [73] | Assignee | General Motors Corporation<br>Detroit, Mich. |

[54] ELECTRIC DRIVE AND BRAKE ARRANGEMENT AND METHOD
8 Claims, 1 Drawing Fig.

[52] U.S. Cl. .................................................... 318/151,
 318/158, 318/381
[51] Int. Cl. .................................................... H02p 5/22,
 H02p 3/24
[50] Field of Search .......................................... 318/140,
 151, 375, 381, 158

[56] References Cited
UNITED STATES PATENTS
1,909,886   5/1933   Olofson .......................... 318/151
2,749,497   6/1956   Frier ............................... 318/140
2,488,403   11/1949  Happel ........................... 318/381

*Primary Examiner*—Benjamin Dobeck
*Assistant Examiner*—K. L. Crosson
*Attorneys*—J.L. Carpenter and Robert J. Outland ABSTRACT: An electric drive and dynamic braking arrangement intended in a preferred embodiment for driving and braking a vehicle, such as a heavy off-road truck, and having a pair of traction motors arranged to be driven by DC current obtained by rectifying the output of an AC generator, so as to drive the vehicle. Braking is also provided by the traction motors by separately exciting their fields with the generator output and dissipating the current generated in the traction motor armatures in resistance grids connected in series with the armatures. Rapid changeover from the power mode to the brake mode is provided by an arrangement which momentarily short-circuits the generator at the beginning of the brake mode connection to quickly reduce the residual generator voltage to a value sufficiently low to avoid overexciting the traction motors so as to prevent consequent possible damage to them.

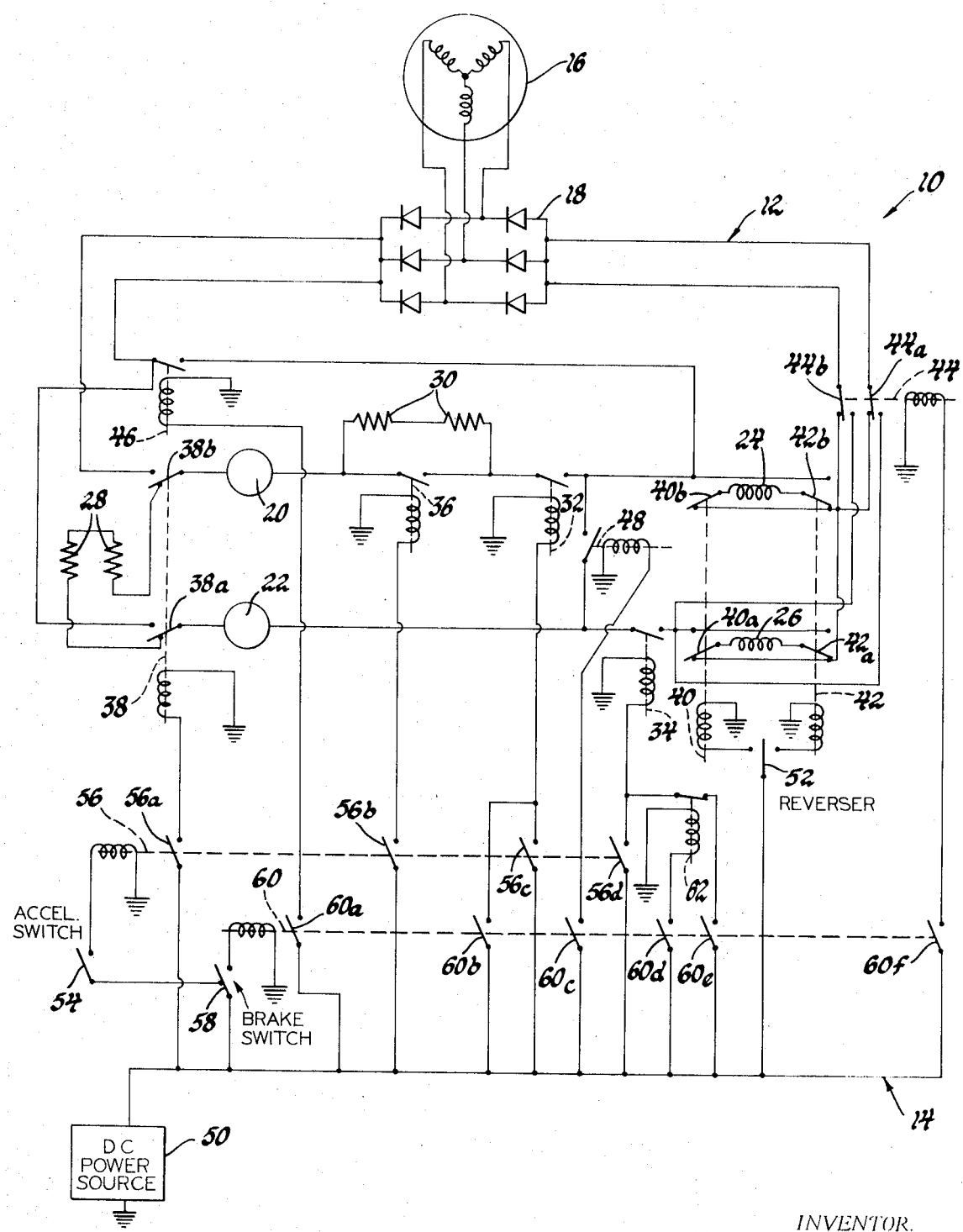

ELECTRIC DRIVE AND BRAKE ARRANGEMENT AND METHOD

FIELD OF THE INVENTION

This invention relates to electric drive and braking arrangements especially for use in heavy vehicles, and more particularly to an electric drive arrangement including dynamic braking and having the capability of being rapidly switched from the power to the braking condition.

DESCRIPTION OF THE PRIOR ART

It is known in the art to utilize electric drives for vehicles wherein DC electric traction motors are connected to receive current from a generator, which may be DC or rectified AC, that is in turn driven by a prime mover such as a diesel engine. It is also known to provide for dynamic braking of such electrically driven vehicles by utilizing the traction motors as generators and supplying the current from the traction motor armatures to resistance grids carried in the vehicle, so as to dissipate the electrical energy developed in the traction motors as heat. In such arrangements it is also known to vary the dynamic braking effort by varying the traction motor field excitation, such as by connecting the motor fields directly to the traction generator and controlling the current flow by varying the excitation of the generator with a controller. Such arrangements have been extensively utilized in diesel locomotives for railroad use where the dynamic brake feature is utilized primarily as a retarding or holding brake to maintain suitable maximum speeds when running down long grades, thereby preventing excessive heating and wear of the service air brakes.

When it was desired to apply this type of electric drive and dynamic braking system to a large off-highway truck having a capacity on the order of 200 tons and intended for use in general hauling for open pit mines and the like, it was determined that some difficulty would be encountered due to an operating characteristic of the dynamic brake system which, while causing no particular difficulty in railroad use, would not be satisfactory in the intended truck use. This stemmed from the fact that the operating conditions of the truck required considerably more rapid changes in condition from full power to braking than are required in railroad service, the situation being complicated by the fact that in the truck, the dynamic brake was to be utilized as the main retarding brake for all operating conditions down to speeds to about 2 miles per hour or less, at which point the air braking system could be used to stop the vehicle. With this arrangement, the truck operator was required to have nearly instantaneous control of the braking of his vehicle and thus there could be only a very short delay permitted in the switching of the electric drive system from the power mode to the braking mode.

In the prior locomotive systems, it was necessary when switching from a full power condition to dynamic braking to first switch out of the power mode and then wait for a period up to 10 seconds or so for the residual field in the main generator to decay before completing the connection of the main generator to the traction motor fields. If this connection were to be made too soon, the high residual voltage in the generator would cause an excessive current flow through the motor fields, which would in turn cause excessive generated voltages in the traction motors and possible damage due to flashovers in the traction motor armatures. Since the 10 second delay for switching from power to brake modes in the anticipated truck application was entirely too great, it was necessary to devise an arrangement in which this delay period could be substantially reduced.

SUMMARY OF THE INVENTION

The present invention provides a solution to the previously described problem in the form of a simple method and means for decaying the generator voltage quickly when it is desired to switch from the power mode to the dynamic braking mode in a system of the type previously described. The simple step involved is to momentarily short circuit the main generator after the power circuit has been disconnected and during the initial portion of the braking mode.

While such an idea would normally appear somewhat foolhardy and be expected to lead to severe damage to the generator, I have found that applying such a short circuit for a period of one-half second or so, after the external generator excitation has been cut off, causes a very brief current surge which rapidly develops a back EMF in the generator. This opposes the residual generator field, causing this field and the residual voltage to rapidly drop to a negligible value. The quick voltage drop then permits the change to be made from the power mode to the dynamic braking mode nearly as fast as the switching equipment involved can make the change; that is, within about one or two seconds. Such a rapid change has been found to be adequate for the safe control of the heavy truck vehicles to which the system has been applied.

The actual arrangement of the system utilizes the addition of a time-delay relay which is arranged to close one of the power contactors when the circuit is switched to the braking mode so as to initiate the short circuit. The time-delay relay holds this circuit closed for one-half second or any other desired predetermined time period and then opens the power contactor, cutting off the short circuit of the generator and leaving the connections in the condition for normal dynamic brake operation. Further advantages and details of operation of the system will be more clearly understood from the following description of a preferred embodiment, taken together with the accompanying drawing.

BRIEF DESCRIPTION OF THE DRAWING

The single figure of the drawing discloses diagrammatically an exemplary electric drive and dynamic braking arrangement comprising a preferred embodiment of the invention chosen for purposes of illustration.

DESCRIPTION OF THE PREFERRED EMBODIMENT

In the drawing, numeral 10 generally indicates in diagrammatic form an electric drive and dynamic braking arrangement according to the invention and including a power circuit generally indicated by numeral 12 and a control circuit generally indicated by numeral 14.

The main components of the power circuit are a three-phase alternating current main generator 16; a power rectifier 18; first and second DC traction motors having armatures 20 and 22, respectively, which are in turn mounted within housings not shown, containing field windings 24 and 26, respectively; and first and second pairs of resistance grids 28 and 30, respectively. A plurality of contactors are provided for connecting the various components in the desired operating modes, including first, second and third single pole power contactors 32, 34 and 36, respectively; a two-pole motor contactor 38; two-pole forward and reverse contactors 40 and 42, respectively; a two-pole first braking contactor 44 and single pole second and third braking contactors 46 and 48, respectively.

The control circuit includes a separate DC power source 50 which may comprise batteries or a suitable generator, either DC or AC with means for rectifying the current output. Also included is a double throw reverser switch 52; a manually actuated accelerator switch 54 feeding a multipole accelerator switch relay 56 and a double throw brake switch 58 feeding the accelerator switch; and a multipole brake switch relay 60.

All the contactors and relays are shown on the drawing in their deenergized positions. The AC generator 16 is permanently connected to the rectifier 18, which converts the AC generator output to DC. The rectifier is then connected through suitable wiring with the various components of the power circuit and the control switches and relays are connected to their power source in the manner shown.

The operation of the arrangement to drive or brake the vehicle requires first that the reverser switch 52 be placed in either the forward or reverse position. Assuming that the reverser switch is in the forward position, the forward relay 40 will be energized by current from the DC power source, moving its switch poles 40a and 40b upwardly, as shown in the drawing, to provide for the possibility of current flow through the motor field windings 24 and 26.

In this condition, if the accelerator switch 54 is closed, such as by the vehicle operator's depressing the accelerator pedal (not shown), this will energize the accelerator switch relay 56, closing its contacts 56a through 56d. This will, in turn, energize the motor contactor 38 and the first, second and third power contactors 32, 34 and 36, respectively, providing parallel paths of flow for generator current from the rectifier 18 through the traction motor armatures and their respective field coils. One such path passes through motor contactor pole 38b, motor armature 20, power contactors 36 and 32, forward relay pole 40b, motor field winding 24, reverse relay pole 42b and brake relay pole 44a before returning to the rectifier. The other flow path is through motor contactor pole 38a, motor armature 22, power contactor 34, forward contactor pole 40a, motor field winding 26, reverse contactor pole 42a, brake contactor pole 44b and thence back to the rectifier. In this way, the traction motor armatures are connected in parallel with one another and in series with their respective field windings, the rectifier and the AC generator, and power is delivered by the traction motor armatures to the vehicle wheels (not shown) in proportion to the voltage and current delivered by the generator as determined by suitable generator controlling and exciting means (also not shown).

If the operator now decides to apply the dynamic brakes to slow down the vehicle, he will depress the brake pedal (not shown), thus actuating the brake switch 58 in a clockwise direction from the position shown in the drawing, to close the circuit to the brake switch relay. This movement will, first, open the circuit to the accelerator switch relay, whether or not the operator's foot has been removed from the accelerator pedal, so that the power contactors 32, 34 and 36 will be opened and the motor contactor 38 will return to its deenergized position. Also, through mechanism not shown, the main generator excitation will be disconnected. Energizing of the brake switch relay then closes it contacts 60a through 60f, which will in turn reenergize power contactors 32 and 34, as well as the brake relays 44, 46 and 48. In addition, the time-delay relay 62 will be energized but will not open until the expiration of the preset time delay period.

Thus, the application of the brake switch to energize the brake switch relay and the closing of its contacts rearranges the power and brake contactors and the motor contactor is position for operating in the brake mode, except that power contactor 34 is closed, rather than open. The closing of this contactor, in conjunction with the other circuit changes, creates a short circuit of the generator output, the flow path passing from the rectifier 18 through brake contactors 46 and 48 and power contactor 34; thence in parallel paths through both poles of brake contactor 44 and back to the rectifier 18. As previously explained, this short circuit creates a momentary high current flow through the generator, which creates a back EMF opposing the residual voltage which remains after removal of the excitation current. The back EMF developed quickly collapses the residual generator field so that the generator voltage drops to a negligible amount within a period of less than half a second.

The short circuit condition continues only during the predetermined time delay period preset for actuation of time-delay relay 62 after it is energized. In one actual installation, a period of one-half second was found to be adequate, although other periods could be used. Thus, the time-delay relay remains closed for the delay period, after which it opens, cutting off current flow to the coil of power contactor 34. This contactor then opens, removing the generator short circuit and establishing the connections in the brake mode.

In the brake mode, current delivered by main generator 16 is controlled by separate generator excitation controls (not shown) of conventional design. The flow of current is from the generator through the rectifier 18 and from the rectifier through brake contactor 46, pole 40b of the forward contactor, field winding 24, poles 42b and 42a of the reverse contactor, through field winding 26 in a reverse direction, through pole 40a of the forward contractor and then in parallel paths through poles 44a and 44b of the brake contactor 44 and back to the rectifier. In this way the excitation of the traction motor field windings is controlled by the output of the AC generator, as desired by the operator, to control braking effort.

The traction motors are, in turn, connected in series with the respective pairs of grids and with each other so that current generated by the traction motor armatures, as they are rotated by the inertia of the vehicle, is dissipated in the grids, thus absorbing power and creating a braking effect on the vehicle. Current flow in this circuit is from traction motor armature 20 through pole 38b of the motor contactor; thence through the pair of grids 28 which are connected in series and through pole 38a of the motor contactor; then through traction motor armature 22, brake contactor 48, power contactor 32 and pair of grids 30 which are connected in series, back to traction motor armature 20.

The amount of braking is increased or decreased, depending on the increase or decrease in the traction motor field current, as controlled by the vehicle operator through his control of generator excitation, as well as by the increase or decrease in vehicle speed, which varies the speed of the traction motor armatures. Thus, the dynamic braking effect drops off as the vehicle speed decreases, so that, at a predetermined low speed, the braking must be supplemented or replaced by the service air brakes. At higher speeds, however, the dynamic brake is effective to control braking of the vehicle to a near full stop or to hold a constant speed during a long downgrade.

The use of such a brake in a heavy truck is made feasible primarily by applicant's improved arrangement, including means to briefly short circuit the main generator when switching from the power to the brake mode, so that the fields can be quickly collapsed and thus permit a sufficiently rapid change to the braking condition to allow for safe and positive control of the vehicle by the operator. Without this improved arrangement, another type of braking system would be required, at least for emergency conditions, since, without the temporary short circuit feature, the high residual voltages existing in the generator after full power operation would require an excessive period of up to 10 seconds to decay in order that the brake mode could be applied without excessive excitation of the traction motors.

The diagrammatic illustration of the invention in the drawing shows only one of many ways in which the invention could be applied to braking arrangements for vehicles of numerous types, including trucks, locomotives and the like. It should also be understood that the system is not limited only to vehicles but could be applied to other types of electric-drive systems wherein an inertia load is driven which might require braking. Also, systems using either DC or AC generators or various other equivalent components to those shown are contemplated. Accordingly, these and all other applications and variations of the invention are intended to be encompassed within the broader aspects of the disclosure.

I claim:

1. An electric drive and braking arrangement of the type comprising:
   a generator;
   a drive motor having an armature and field windings and connectable to drive an inertia load;
   resistance means for absorbing power;
   connecting means to interconnect said components in one of three modes, namely: a power mode wherein said generator supplies current to said motor for driving said inertia load; a brake mode wherein said generator supplies current to said motor field windings and said motor armature is connected to said resistance means to dissipate power generated by said motor armature and brake said inertia load; and a short circuit mode wherein the generator is short-circuited; and control means selectively actuable to connect said connecting means in one of said power and brake modes, said control means including means to, upon selection of the brake mode, first connect said connecting means for a predetermined brief period in the short circuit mode to quickly reduce residual generator voltage and to thereafter connect the connecting means in the brake mode.

2. The arrangement of claim 1 wherein said control means includes a first switch operable to place said connecting means in the power mode, a second switch operable to override said first switch and to place said connecting means in the brake mode and short circuit means arranged to temporarily place said connecting means in the short circuit mode upon actuation of said second switch.

3. The arrangement of claim 2 wherein said connecting means includes a contactor adapted to complete the short circuit of said generator when closed during said brake mode and said short circuit means comprises a time-delay relay arranged to maintain said contactor closed for a brief interval after said second switch is operated to select the brake mode and to subsequently act to open said contactor so as to complete the change to the brake mode.

4. An electric drive and dynamic braking arrangement for a vehicle having a power source and drive wheel means, said arrangement comprising:
 a generator;
 a traction motor having an armature and field windings and connectable with said drive wheel means for driving and braking said vehicle;
 resistance grid means for absorbing power;
 connecting means to interconnect said components in one of three modes, namely: a power mode wherein said generator supplies current to said motor for driving said vehicle; a brake mode wherein said generator supplies current to said motor field windings and said motor armature is connected to said resistance grid means to dissipate power generated by said motor armature and brake said inertia load; and a short circuit mode wherein said generator is short-circuited; and
 control means selectively actuable to connect said connecting means in one of said power and brake modes, said control means including means to, upon selection of the brake mode, first connect said connecting means for a predetermined brief period in the short circuit mode to quickly reduce residual generator voltage and to thereafter connect the connecting means in the brake mode.

5. The arrangement of claim 4 wherein said control means includes a first switch operable to place said connecting means in the power mode, a second switch operable to override said first switch and to place said connecting means in the brake mode and short circuit means arranged to temporarily place said connecting means in the short circuit mode upon actuation of said second switch.

6. The arrangement of claim 5 wherein said connecting means includes a contactor adapted to complete the short circuit of said generator when closed during said brake mode and said short circuit means comprises a time-delay relay arranged to maintain said contactor closed for a brief interval after said second switch is operated to selected the brake mode and to subsequently act to open said contactor so as to complete the change to the brake mode.

7. The method of operating an electric drive and braking arrangement of the type having a generator, a drive motor having an armature and field windings and connected with an inertia load, resistance grid means and connecting means to interconnect said components in either of two modes, namely: a power mode wherein said generator supplies current to said motor for driving the inertia load, and a brake mode wherein said generator supplies current to said motor field windings and said motor armature is connected to said resistance means to dissipate power generated by said motor armature and brake said inertia load, said operating method comprising the step of momentarily short-circuiting the generator without generator excitation to reduce residual generator voltage while in process of changing the component connections from the power mode to the brake mode so as to permit a rapid change from power to brake modes without overexcitation of the drive motor.

8. The method of claim 7 wherein the stop of short-circuiting the generator is initiated concurrently with the step of connecting the components in the brake mode such that when the short circuit is broken, the components will remain connected in the brake mode.